(12) United States Patent
Ward et al.

(10) Patent No.: US 10,178,376 B2
(45) Date of Patent: Jan. 8, 2019

(54) HYBRID TRANSPARENT AUTO STEREOSCOPIC DISPLAY

(71) Applicant: Superlumenary, Philadelphia, PA (US)

(72) Inventors: Matthew E Ward, Philadelphia, PA (US); Michael Dorin, New York, NY (US); Thomas Zerega, Hoboken, NJ (US)

(*) Notice: Subject to any disclaimer, the term of this patent is extended or adjusted under 35 U.S.C. 154(b) by 539 days.

(21) Appl. No.: 14/716,783

(22) Filed: May 19, 2015

(65) Prior Publication Data

US 2015/0334378 A1 Nov. 19, 2015

Related U.S. Application Data

(60) Provisional application No. 62/038,249, filed on Aug. 16, 2014, provisional application No. 62/000,187, filed on May 19, 2014.

(51) Int. Cl.
*G02F 1/1335* (2006.01)
*H04N 13/305* (2018.01)
*H04N 13/31* (2018.01)

(52) U.S. Cl.
CPC .......... *H04N 13/305* (2018.05); *H04N 13/31* (2018.05); *H04N 2213/001* (2013.01)

(58) Field of Classification Search
CPC combination set(s) only.
See application file for complete search history.

(56) References Cited

U.S. PATENT DOCUMENTS

2008/0259156 A1* 10/2008 Zhang ............... G02B 27/2214
348/51
2013/0257828 A1* 10/2013 Azuma .................... G02F 1/29
345/204

* cited by examiner

*Primary Examiner* — Wen-Ying P Chen
(74) *Attorney, Agent, or Firm* — Schott, P.C.

(57) ABSTRACT

A transparent LCD monitor can be layered with a custom optical element that covers a portion of the display surface to create a hybrid solution that is enabled to show 3D content (including both off-screen "pop" in front of the display and an immersive perception of depth behind the display) without the need for any special eyewear while maintaining a high degree of transparency in the unmodified portions of the display.

7 Claims, 18 Drawing Sheets

APPLICATIONS

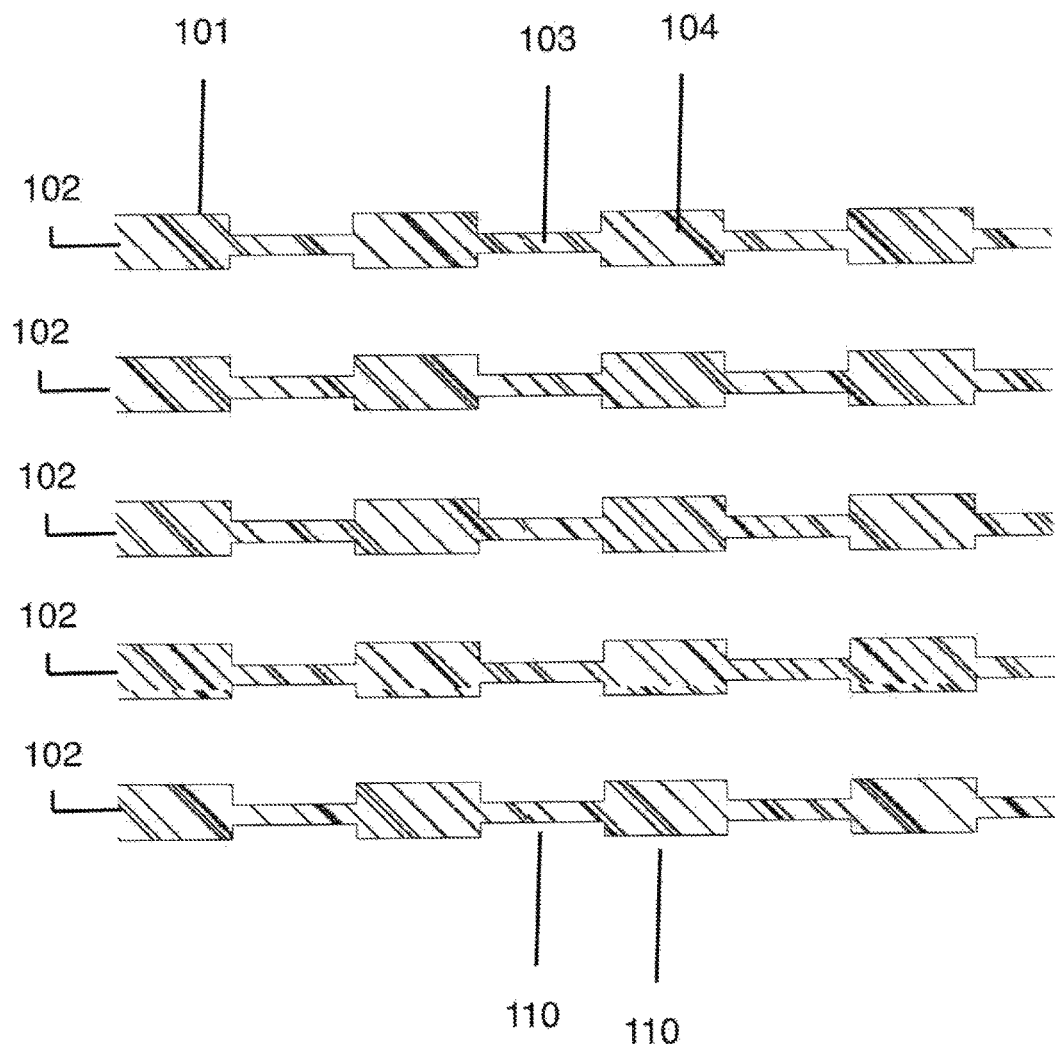
FIG. 1: LENS STRUCTURE

FIG. 2: LCD PANEL
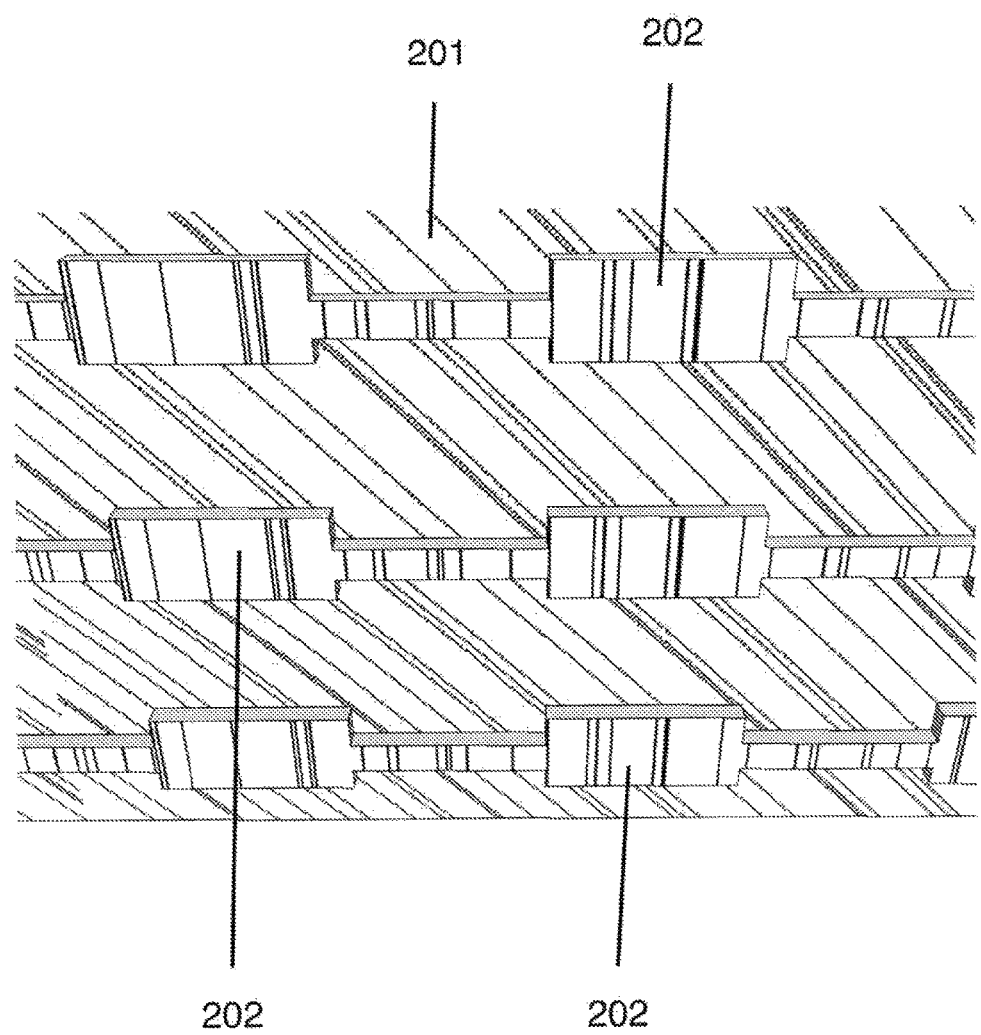

FIG. 3: APPLICATIONS
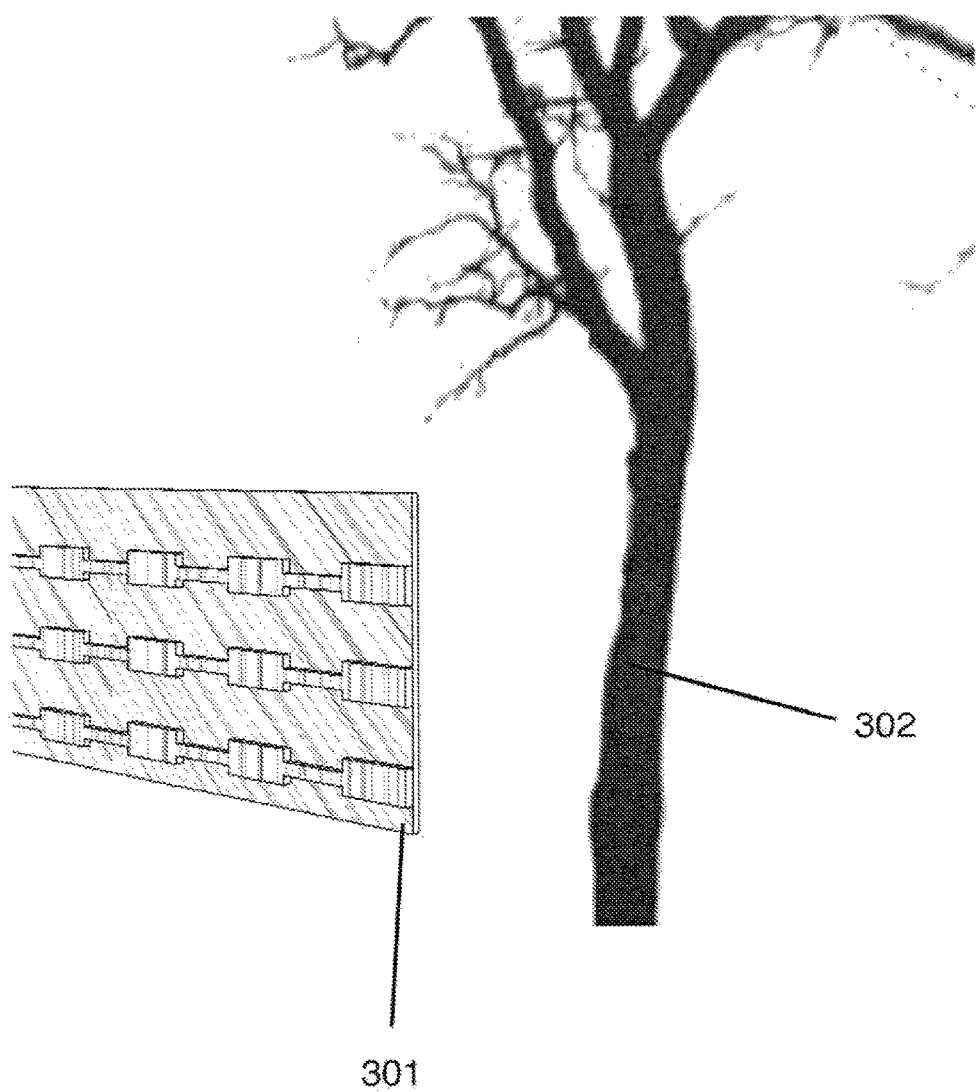

FIG. 4: ALTERNATE LENS ARRANGEMENT
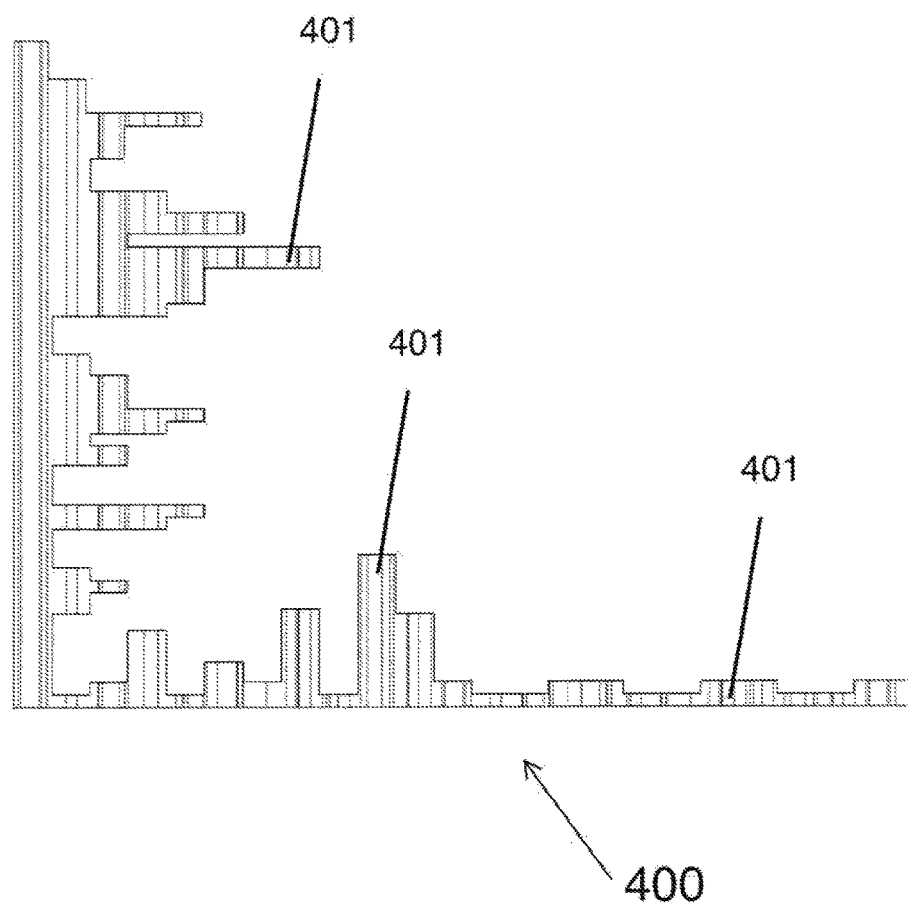

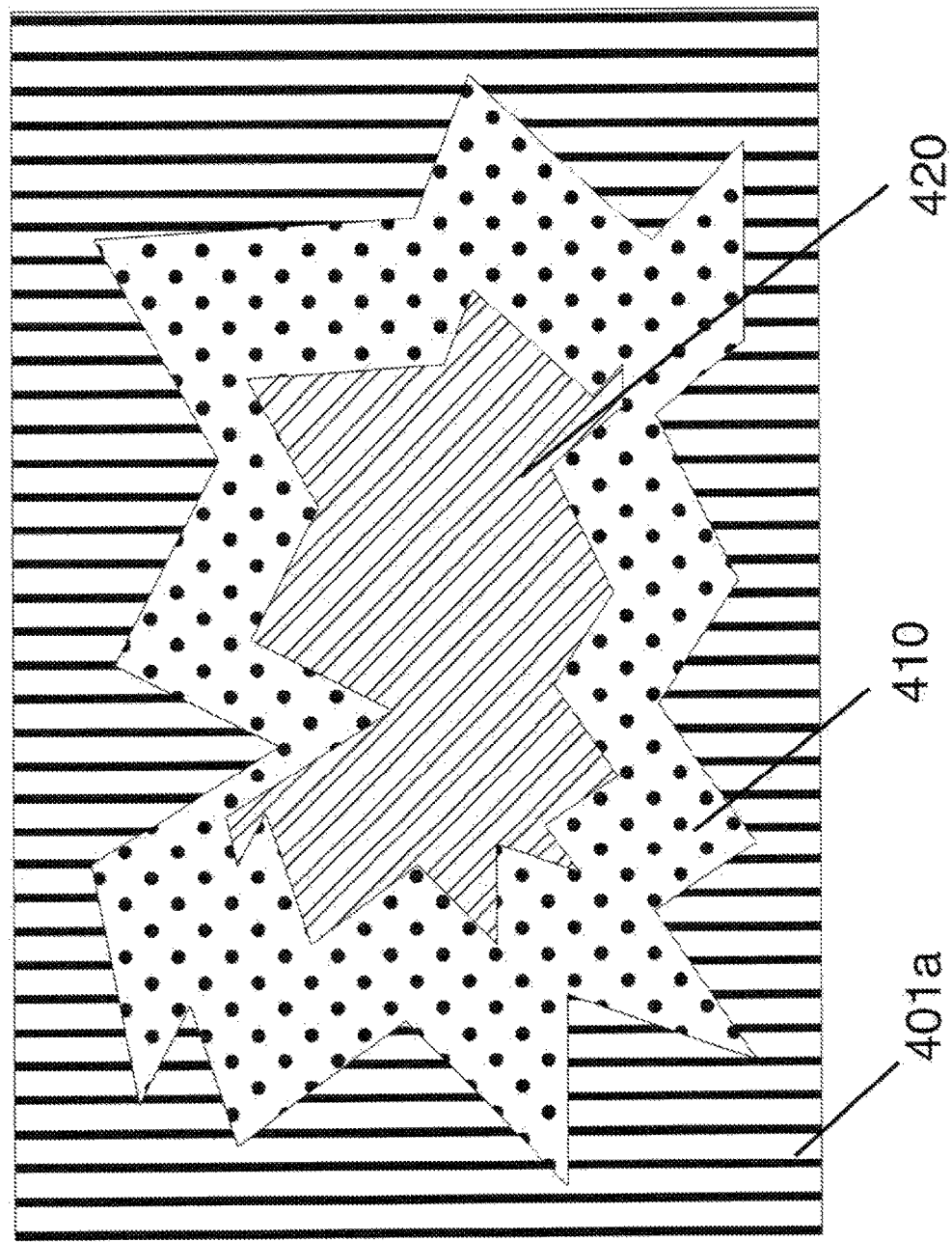

1715

1710

1710  1715

HYBRID TRANSPARENT AUTO STEREOSCOPIC DISPLAY

BACKGROUND

LCD monitors have been used as transparent light valves for certain products. The casino industry uses displays where the backlight has been modified to create slot machines where the tumblers are visible through a hole in the backlight. LCD panels have been used in overhead projection machines prior to the design of good low cost data projectors. LCD panels are used in LCD projectors where the light source is directed through the liquid crystal in order to project the image on a surface.

A company has demonstrated the application of layered LCD panels to create a three dimensional display. The application is currently limited by the inefficiency of the panels, however, new IGZO panel technology may reignite interest in these constructions.

Improvements in manufacturing techniques by companies such as Samsung have allowed for the creation of large transparent LCD panels with reasonable color reproduction and off axis viewing. These are intended for installation in the glass doors of refrigerators and in the windows of retail establishments. They can also be used in bus stops, at home, in offices, and so on. There are substantial opportunities for transparent displays alone or with touch screens.

SUMMARY OF THE EMBODIMENTS

However the display can also be used for more theatrical applications. Transparency lends itself to layering. And by overlaying an optical element in strips, sections, or other organic shaped optical element, it is possible to create layers that are enabled to display 3D content that includes both off-screen "pop" in front of the display and an immersive perception of depth behind the display, without the need for any special eyewear.

This invention discloses the design of a transparent LCD panel (or other panel or even other shaped displays) that integrates an autostereoscopic optical element. The optical element may include (but not be limited to) one or more optical technologies such as lenticular lens, parallax barrier, chromatic light deflector, active or switchable membranes, micro mirrors, electro-mechanical lens, shutter, liquid-crystal, molds, films, or other similar systems that allow for the presentation of multiple perspective views of content for 3D, flip, or other optical effects. The design allows for the retention of the original transparency. And the transparency allows a user to introduce other elements including sub-pixel modulated backlights and additional layers of display, and backlights that specifically target modified and non-modified areas of the optical system.

In order to take advantage of the autostereoscopic properties of the display, content may be specially produced to accommodate the regions with and without the optical element.

BRIEF DESCRIPTION OF THE DRAWINGS

FIG. 1 shows an optical element structure.
FIG. 2 shows an LCD panel.
FIG. 3 shows an embodiment of the application in use.
FIGS. 4 and 4A show an alternate optical element arrangement.

DETAILED DESCRIPTION OF THE EMBODIMENTS

Figure 5:
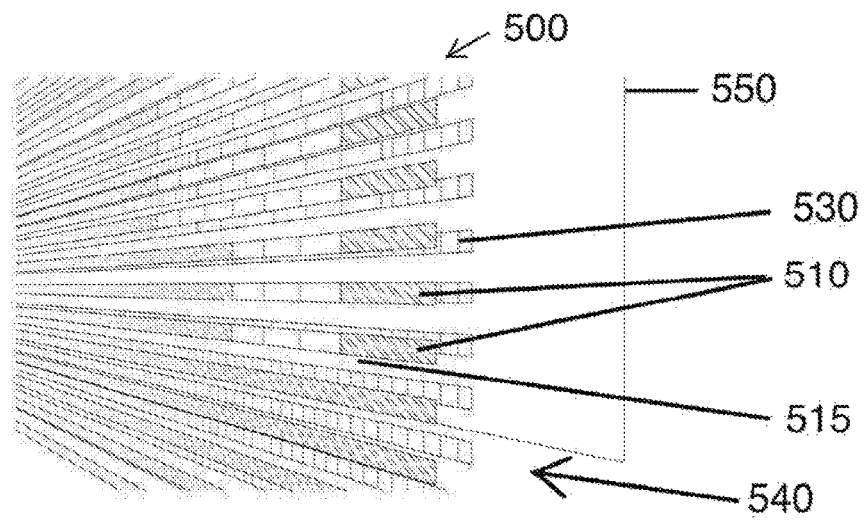
FIGS. 5-7 show different embodiments of a segmented display.

The construction of the display described in this disclosure differs from the construction of a standard autostereoscopic display.

FIG. 1 illustrates one embodiment of the optical element. In this illustration the optical element 101 has been cut into a series of linear ribs 102. In order to maximize transparency the ribs have been constructed with a short section 103 that may be only three pixels high and a tall section 104 that may be eight pixels high. It would be possible to design a rib with multiple heights or a single height. The width of the sections 110 would be a function of the number of vertical slices in the design of the optical element 101.

FIG. 2 illustrates a display 201 with a system of ribs 202 (as described in FIG. 1) laminated to the front of the display. This system may work on any 3D display (LCD, OLED, Projection) where an optical element is placed between the viewer and the display 201.

FIG. 3 illustrates a typical embodiment of the display where the assembled product is placed in front of an object 302. In this case the autostereoscopic portion of the display 301 could be used to create a layer of fire dancing over the surface of the tree object 302. The non-3D sections of the display may not be used at all.

FIGS. 4 and 4A illustrate an alternate embodiment of the display 400 where the optical elements 401 feather into the 2D portion of the display, and present a 3D image around a transparent window 405. FIG. 4A shows a variant of this idea where the auto stereoscopic optical element 401 a extends around the outside of a panel, and feathers into the background 410, which may feather into the transparent LCD non-3D content 420.

With the advent of 4 k and 8 k resolution displays, a manufacturer could opt to include autostereoscopic lines in the display in the way that in-cell touch displays include sensors in the display matrix. This way menu items and specially encoded information could be made to pop forward off the screen.

In another embodiment shown in FIG. 5, the display 500 may include several layers. The first layer may be a 3D lenticular segment layer 510 with 3D pixel groups that include different points of view. This 3D lenticular segment layer 510 may be comprised of strips as shown or otherwise segmented. The second layer may be a LCD panel 520 (not shown in FIG. 5 but shown in FIGS. 6 and 7). The third layer may be a backlight unit (BLU) segment layer 530, also in strips.

Fourth and fifth layers may also be present. A fourth layer could be the space layer 540 behind the first-third layers and leave an area for an object to occupy. A fifth layer or background layer 550 may be present and provide a common background for the other layers.

The BLU segment layer 530 may be a segmented OLED layer that is only active when there is content in the 3D segment layer 510. The result is that non-3D segmented layer areas 515, that is, the gaps 515, may be dark and interfere less with a viewer's ability to see through the layers. The relationship between lighting the layers should be managed by the video processor in such a way as to control the emphasis to the user of any one or more layers.

A screen comprising the first through third layers may have multiple backlights with different levels of granularity, and each 3D pixel may have a corresponding backlight segment that may feature a modulated lighting feed.

Active dimming in the backlight minimizes foreground lighting where possible because a bright area in the foreground may impair a viewer's ability to see objects in the background. For example an LED mesh display could be 50% transparent since it is composed of strips with gaps in between each strip but when the LEDs are on and video is playing a viewer will not easily see through the display unless the objects in the background are substantially brighter than the LEDs. The difference between objects and other light sources may affect a viewing experience: An emissive direct source behind the display would likely be visible in a 1:1 relationship with the screen.

Changing the levels in the BLU layer 530 may enhance the 3D appearance by lightening or shading images depending on the information displayed in the 3D layer 510.

Figure 6:
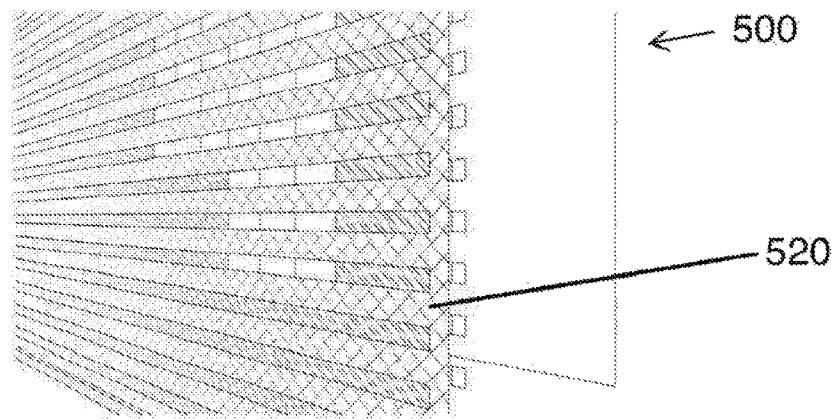
Figure 7:
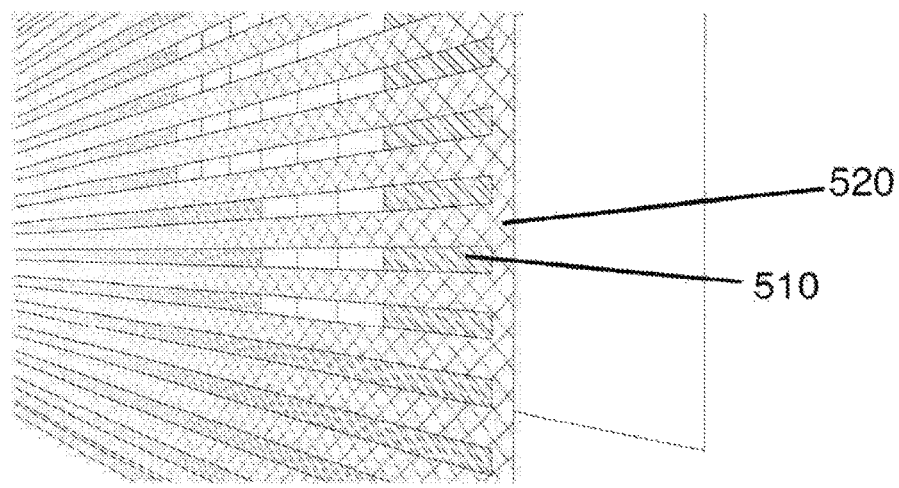

FIG. 6 shows the arrangement of FIG. 5 but with the LCD panel 520 therein. FIG. 7 shows the display of FIG. 5 without the BLU segment layer 530, thus showing that any of the layers may be removed to show a desired effect.

A cover layer (not shown) may be bonded to the 3D layer 510 to reduce visual artifacts that distract a user from the 3*d* and general viewing experience (including that this cover layer may reduce reflections). Such a cover layer may also help fool the viewer into focusing on the cover layer instead of the optical element strips 510.

Figure 8:
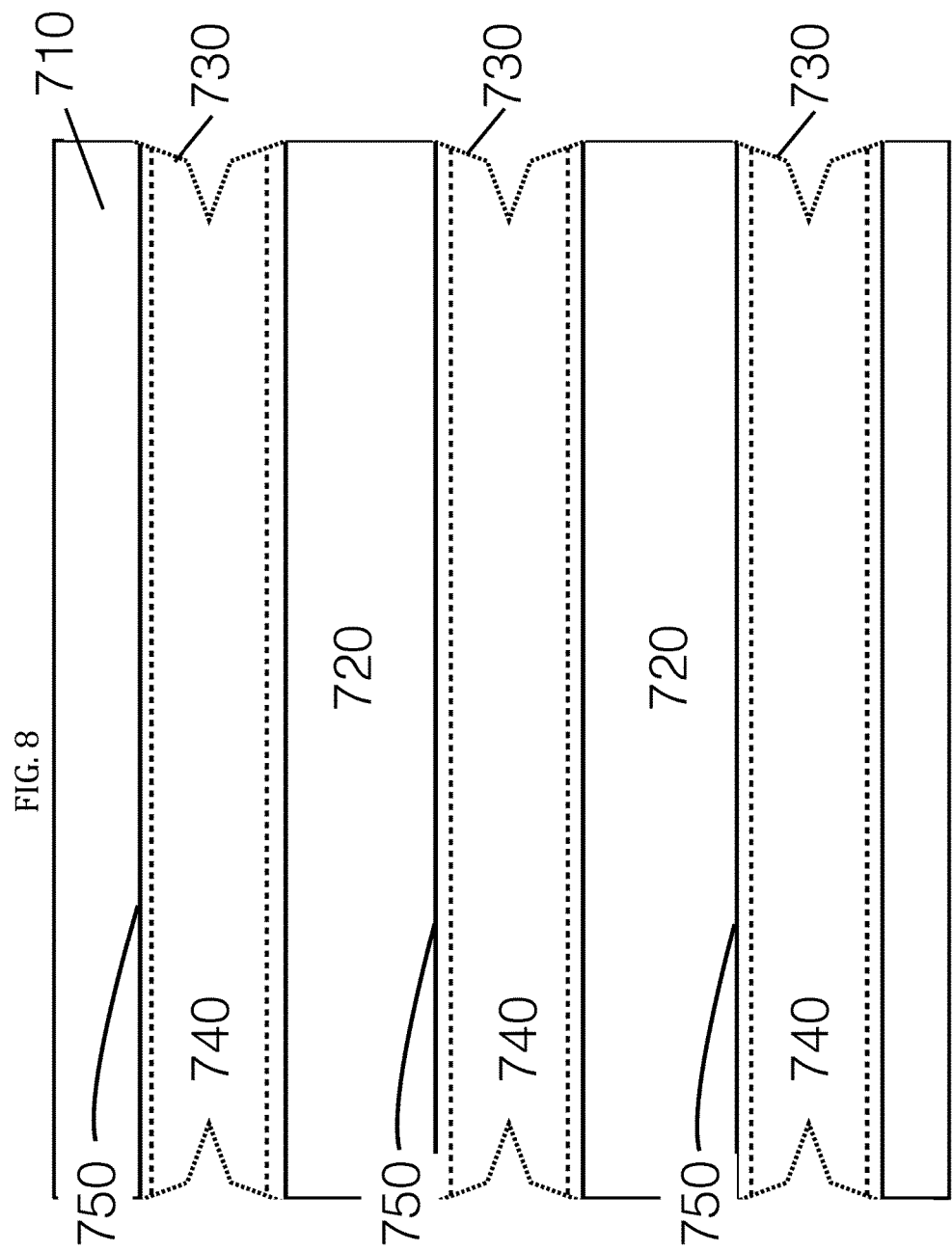
FIG. 8 shows detail of how the content is arranged in the optic

FIG. 8 provides detail on how content may be laid out in one embodiment. In a conventional lenticular design for an auto-stereoscopic display, the removal of a section of the lenticular can create optical artifacts in content that extends to the edge of the remaining lenticular. Content displayed on such a screen 710 may need to be designed to mitigate this effect. The areas that have been removed 720 would function as a typical transparent display. The remaining lenticular ribs 730 would provide auto-stereoscopic content as a layer on top of the transparent content and any objects arranged and illuminated behind the display. Content on the auto-stereoscopic ribs 730 may be divided into two areas. An area with content 740 in the center of the auto-stereoscopic rib 730 and an area that contains no content 750 that would create a content safe area in locations where part of the lenticular had been removed.

Figure 9:
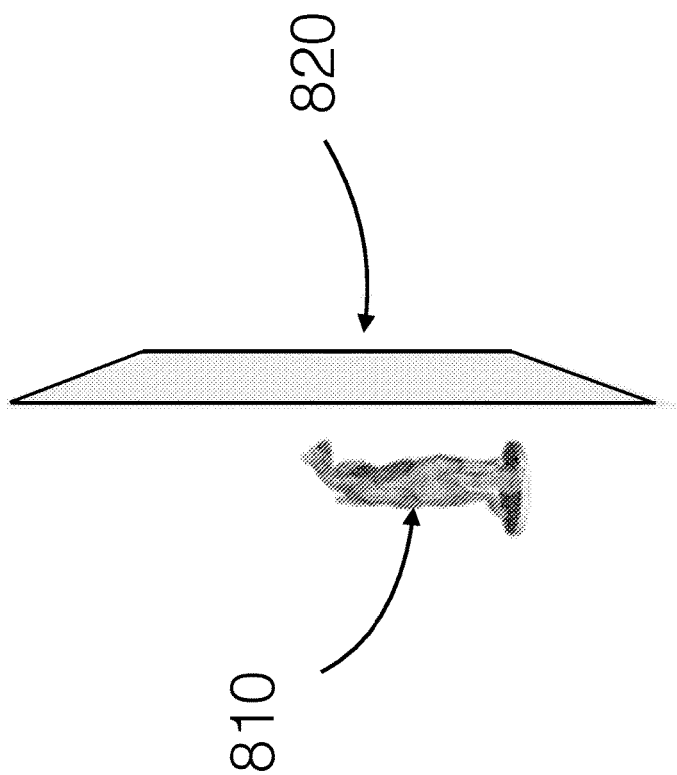
FIGS. 9-13 show one embodiment in an application.
Figure 10:
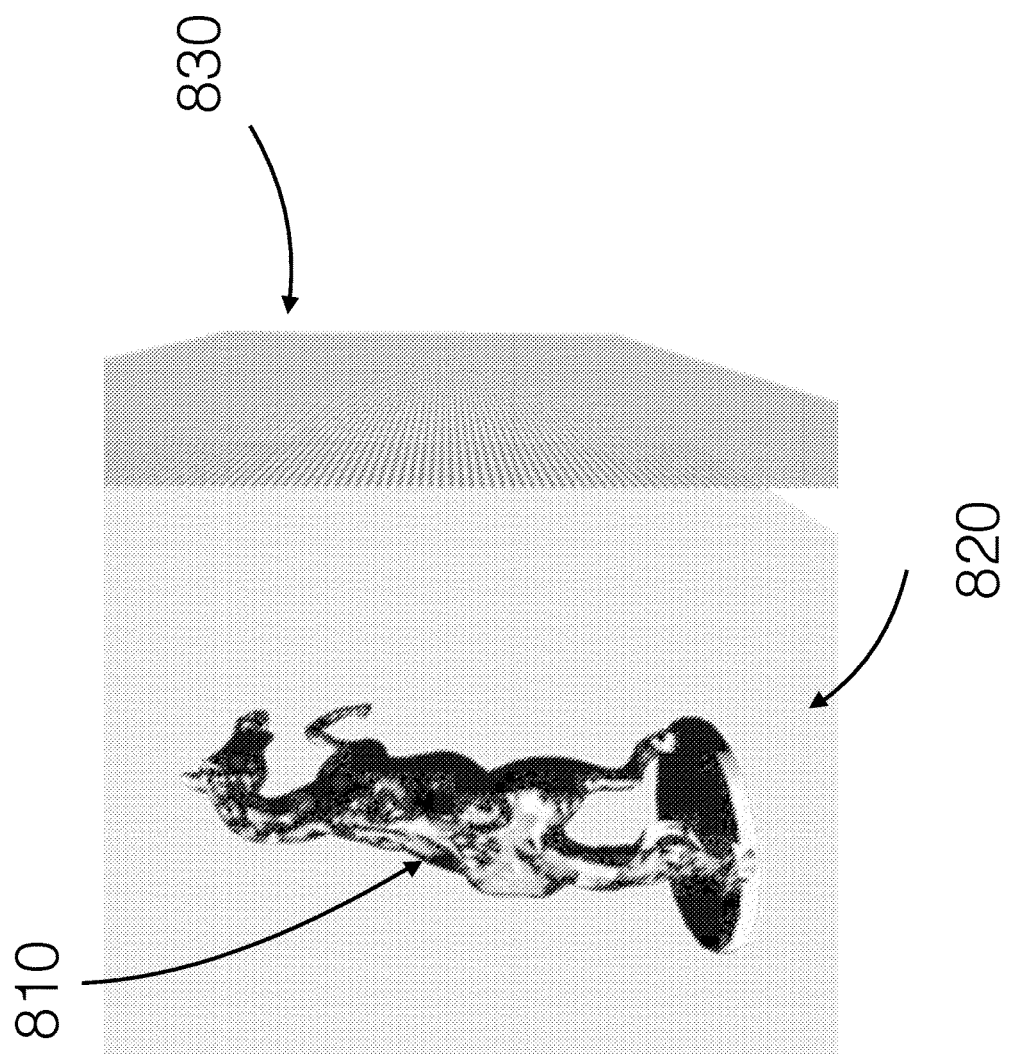

FIG. 9 shows a system where an object is placed behind a transparent LCD monitor. In this case a model of a horse 810 sits directly behind the transparent LCD 820. FIG. 10 shows the effect had by adding an auto-stereoscopic element to the screen. The horse 810 sits behind the transparent LCD monitor 820 with a section of content extending forward from the display 830.

Figure 11:
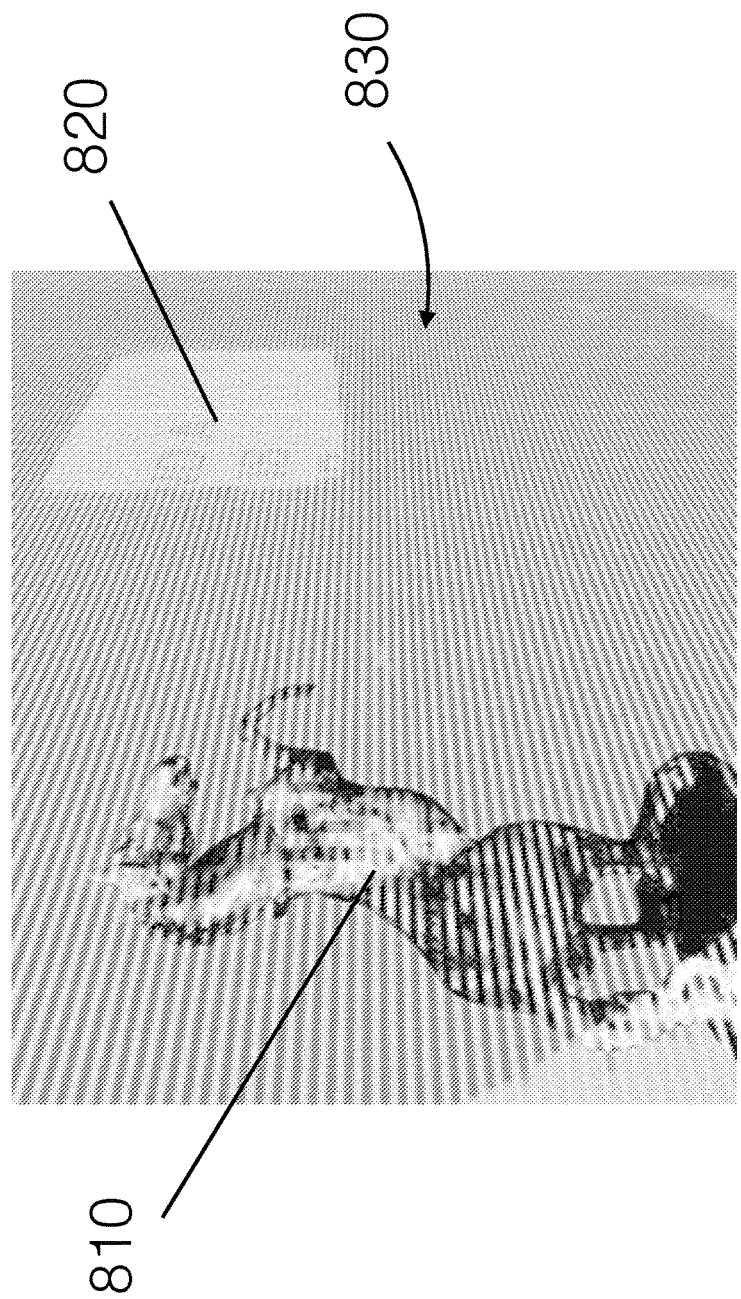
Figure 12:
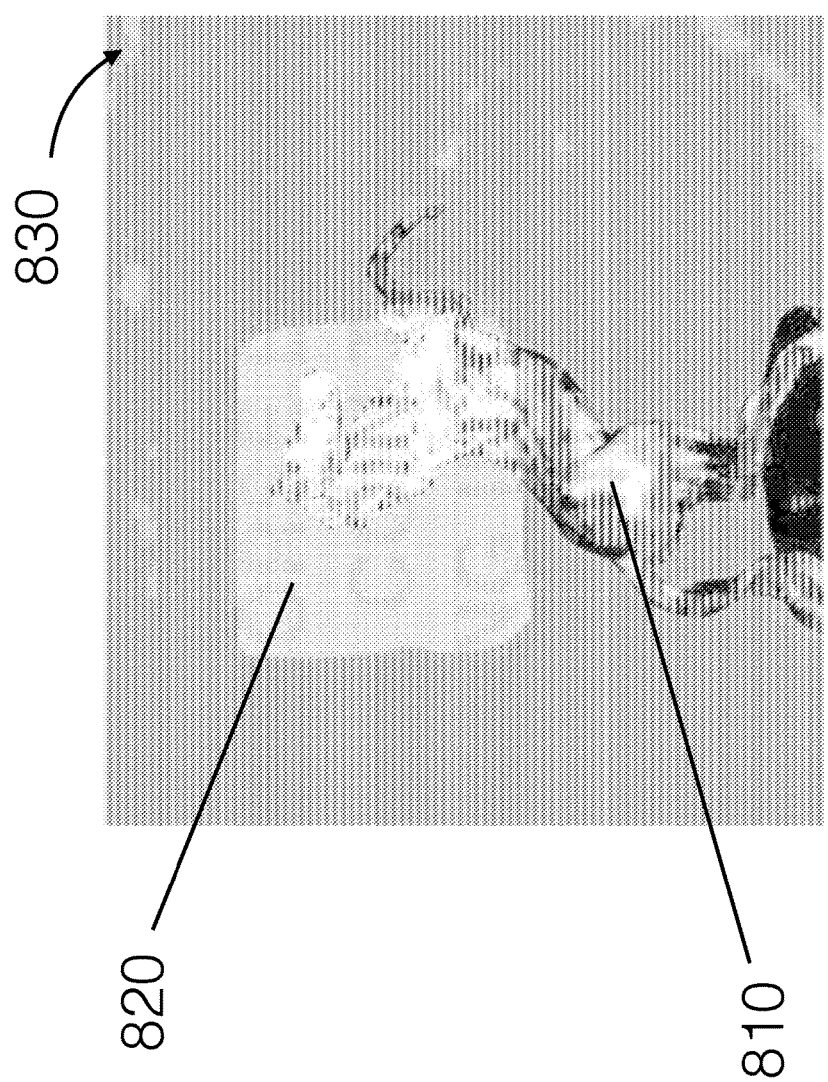
Figure 13:
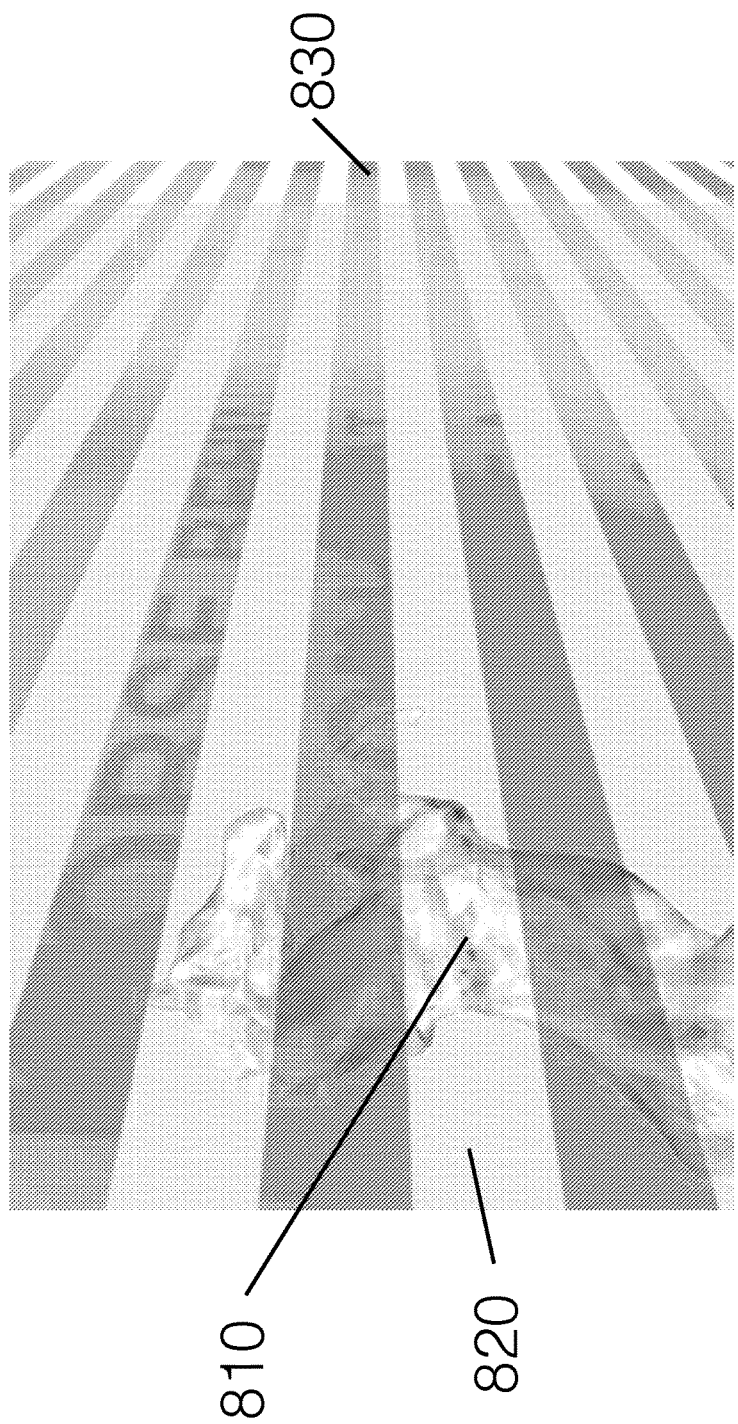

FIG. 11 shows the horse 810 with content on both the transparent 820 and the auto-stereoscopic display 830. FIG. 12 is a front elevation of the display showing the relationship between the content in the transparent 820 and auto-stereoscopic 830 zones of the screen. FIG. 13 shows a detail of the auto-stereoscopic ribs 830.

Figure 14:
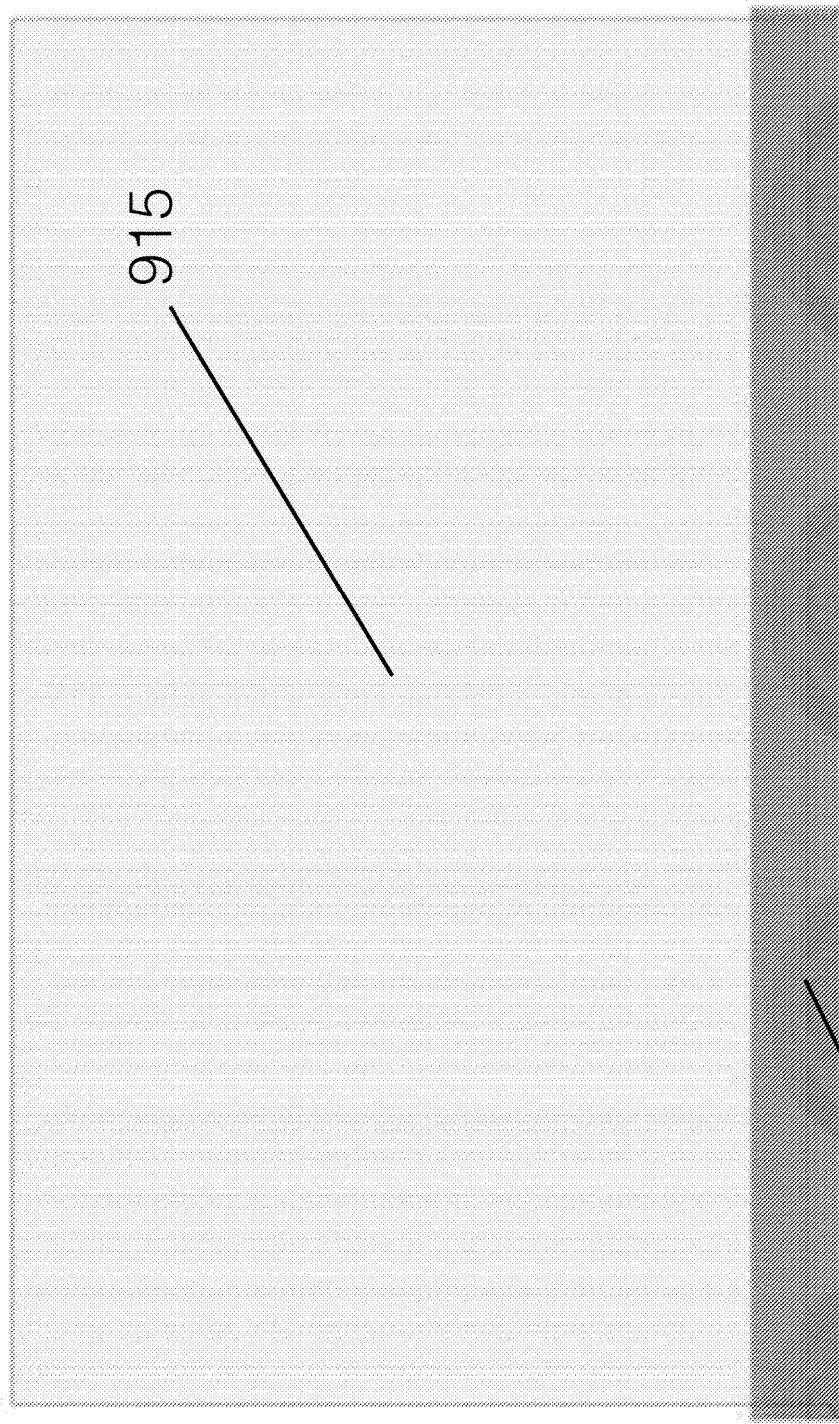
FIGS. 14-15 show another embodiment in a consumer application.

FIG. 14 shows a different embodiment of the disclosure. A standard television set may be outfitted with a fine auto-stereoscopic rib structure without reducing the active screen area by using a 16:10 ratio screen. This leaves a 16:9 area for standard television 915 and a menu and special content area 925 at the bottom of the screen that could provide auto stereoscopic contextual information for advertising and shopping without having the special content frame the primary video feed in the same plane. This may allow for the inclusion of advertising or secondary content without direct visual interaction between the two feeds. Although the ratios discussed are typical for screens, a quarter, half, or any size area could be dedicated to 3D while the other area remaining could be transparent.

In another embodiment, the screen may be formed starting with a 16:9 3D lens (for example and eliminating portions by carefully milling down the screen to create a pattern of lenticular 3D areas and polished transparent areas. In such an embodiment, the creation of the transparent areas is a subtractive process. This could also be done as an additive process where lenticular sections are bonded to a cover glass or directly to the LCD panel.

Figure 15:
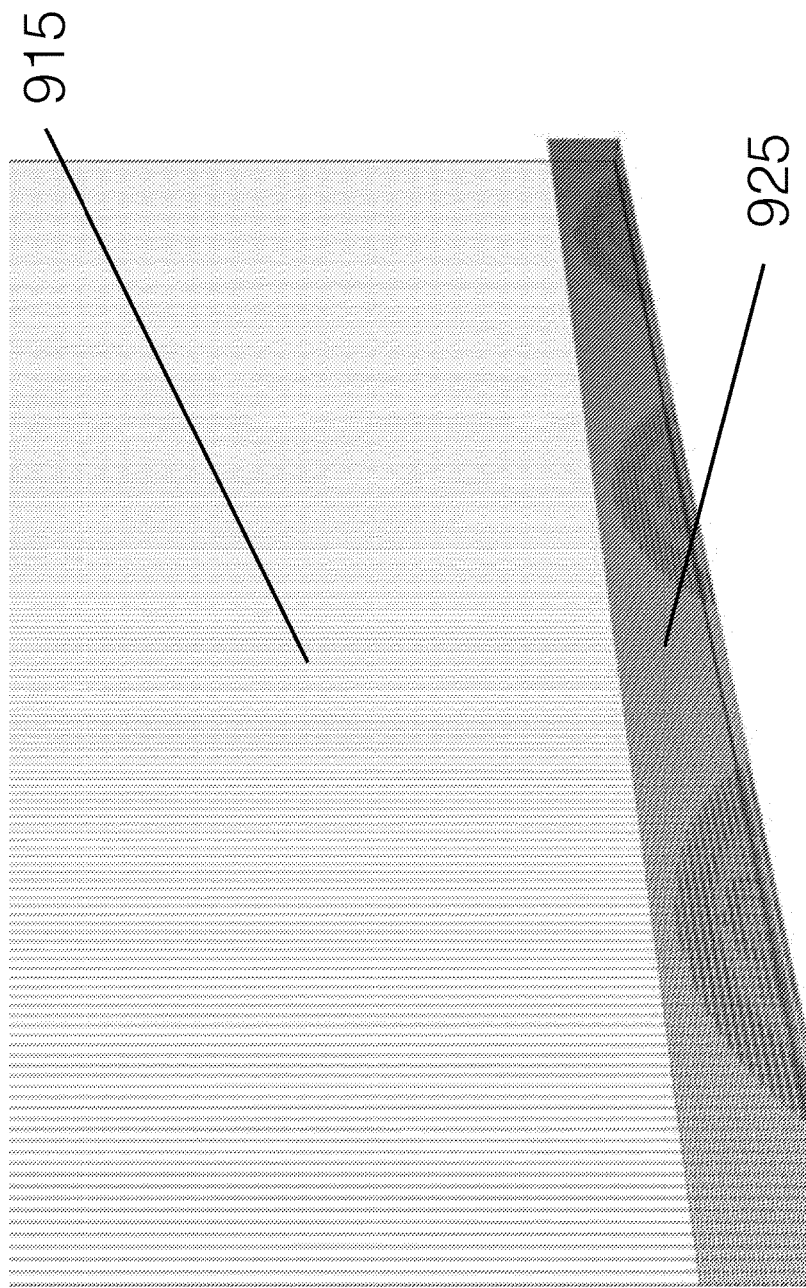

FIG. 15 shows an alternate view of the embodiment in FIG. 14. The special content 925 could float in front of the screen without impacting an incoming feed from a cable or Internet source.

Figure 16:
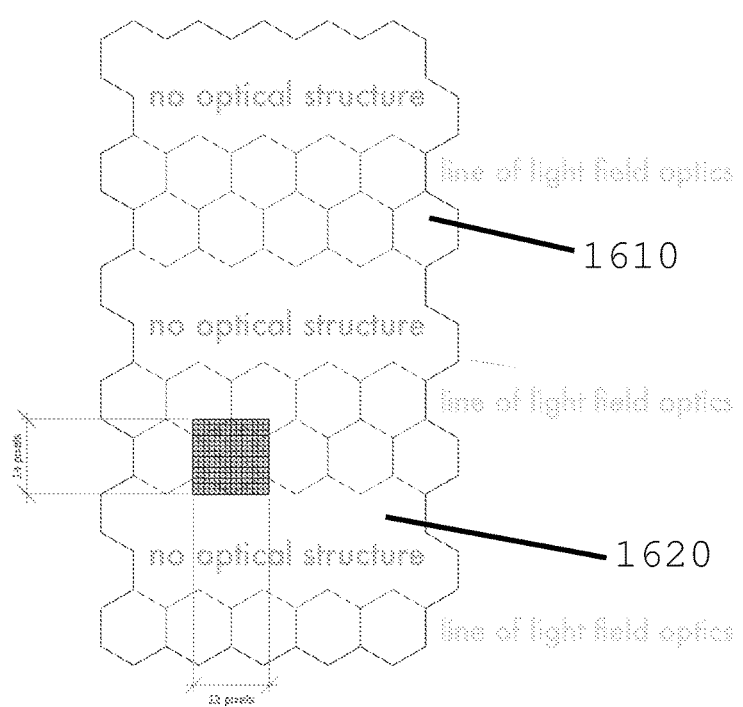
FIG. 16 shows another embodiment in which lenticular strip lenses are instead replaced by hexagonal (or other shape) optical elements interspersed with areas with no hexagonal lenses.

FIG. 16 shows another embodiment in which lenticular strip lenses are instead replaced by hexagonal (or other shape) optical elements 1610 interspersed with areas with no hexagonal lenses 1620. If the hexagonal shapes are light field optics, they have more perceived transparency than lenticular optics and therefore may create a more seamless experience when blending backgrounds with 3D content. Thus, the hexagons are less intrusive and often less noticeable to viewers, often because their shape prevents visual linear artifacts that the viewer can see.

Figure 17:
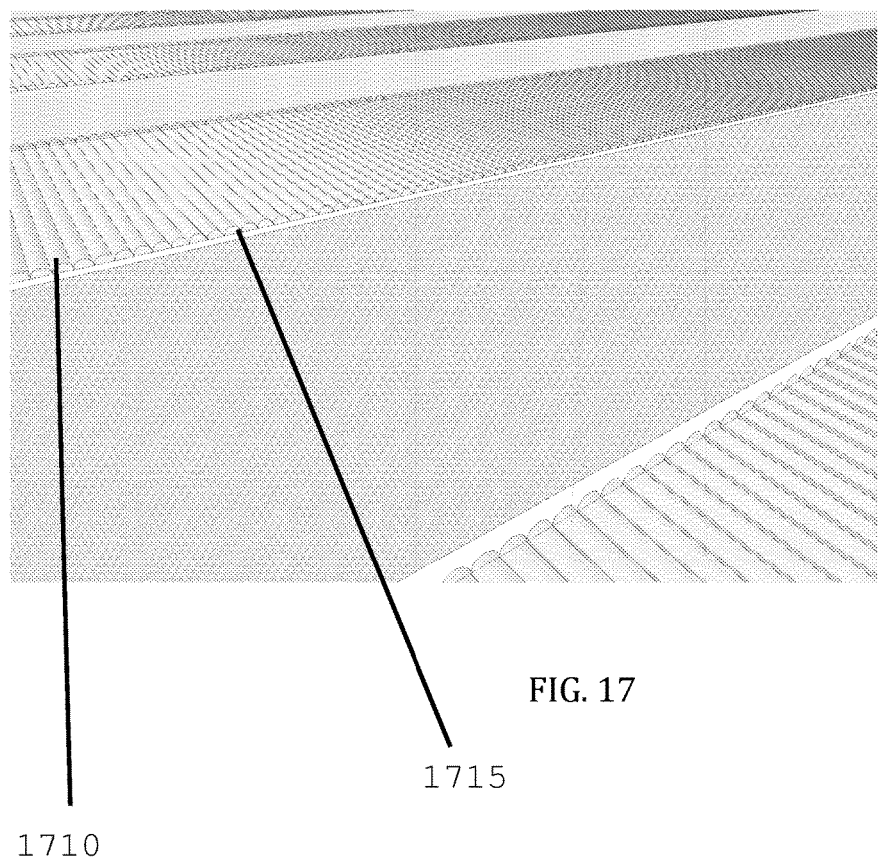
FIGS. 17 and 18 show another embodiment in which the lenticular is a printed lenticular lens.
Figure 18:
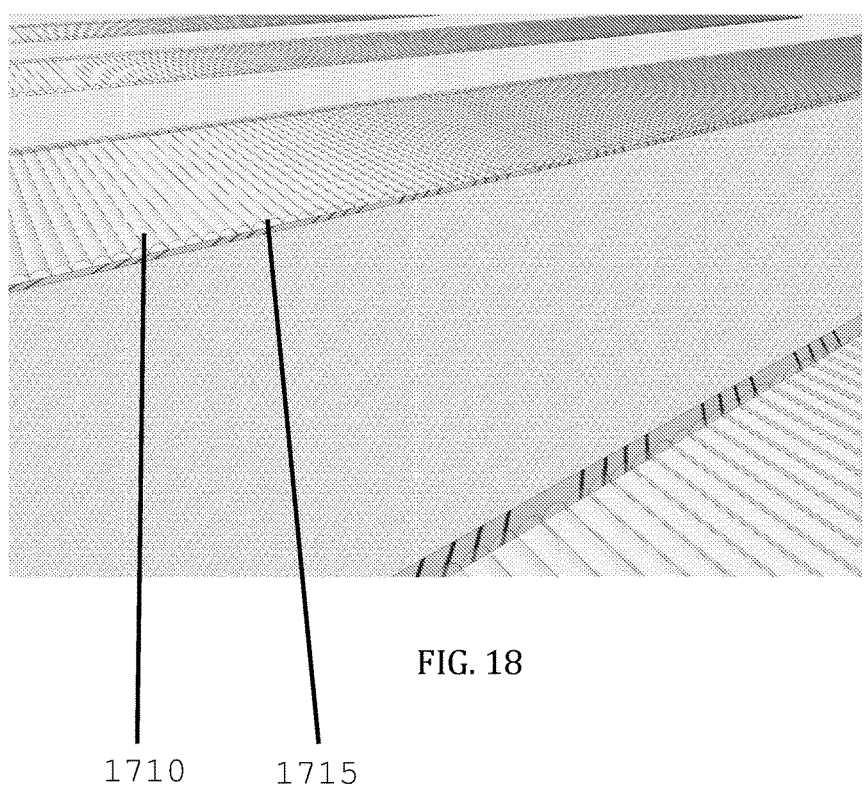

FIGS. 17 and 18 show another embodiment in which the lenticular is a printed lenticular lens 1710. Printed optics can be formed in a technique of 3D printing to form functional optical components such as lenses. This technology is currently used mostly in the LED lighting industry.

3D printing may be done economically using 3D printers but optical quality printing requires higher design and equipment capabilities to when compared to other 3D printed applications, the challenge being to produce transparent, smooth, and optically functional products.

Such a printing method when used with a lenticular lens 1710 may create a printed edge that prevents leakage from the edge 1715 of the lenticular lens. This printed edge 1715 may be opaque or reflect light away from a viewer in another way so as not to create ghosting or other image distortion at the edges. In current lenticular lens systems, the more lines of lenticular lenses, the more edge effects the viewer sees. In use, designers tend not to display images to the edge and so compounding matters, the more lenticular lenses that are being used, the greater the area of unused lens and less viewable area for the user.

In another embodiment, the lens may be formed using an electrowetting material, thus creating areas of visibility and transparency using electrowetting properties. A lens used herein may apply electrowetting technologies and a combination of transparent and optically defect-free liquids to create a lens and change its characteristics in real time. An electrowetting lens uses hydrophilic and hydrophobic properties of the lens material to shape the lens. This means that an electrowetting material can be shaped dynamically, creating shifting shapes of transparency through such a lens.

While the invention has been described with reference to the embodiments above, a person of ordinary skill in the art would understand that various changes or modifications may be made thereto without departing from the scope of the claims.

The invention claimed is:

1. A display system comprising:
a display;
an autostereoscopic optical element that partially overlays the display and includes a lenticular optical element that allows for the presentation content for 3D effects that covers a partial area of the surface of the transparent display;
wherein the autostereoscopic optical element presents a 3D view therethrough to the display. and a 2D view to the display where the autostereoscopic optical element is not present.

2. The display system of claim 1, wherein the autostereoscopic optical element is composed of ribs.

3. The display system of claim 1, wherein the autostereoscopic optical element is composed of a branched pattern.

4. The display system of claim 1, wherein the autostereoscopic optical element is mounted on a transparent carrier material.

5. The display system of claim 1, wherein there are multiple discrete autostereoscopic optical elements.

6. The display system of claim 5, wherein the discrete autostereoscopic optical elements are arranged on a transparent carrier material.

7. The display system of claim 1, further comprising a backlight segment layer that is active when there is content in the region with the autostereoscopic optical element.

* * * * *

UNITED STATES PATENT AND TRADEMARK OFFICE
CERTIFICATE OF CORRECTION

| | | |
|---|---|---|
| PATENT NO. | : 10,178,376 B2 | Page 1 of 1 |
| APPLICATION NO. | : 14/716783 | |
| DATED | : January 8, 2019 | |
| INVENTOR(S) | : Ward et al. | |

It is certified that error appears in the above-identified patent and that said Letters Patent is hereby corrected as shown below:

On the Title Page

Item (72), under "Inventors", in Column 1, Line 1, delete "Matthew E Ward," and insert -- Matthew E. Ward, --, therefor.

In the Specification

In Column 2, Line 2, delete "optic" and insert -- optical arrangement. --, therefor.

In Column 2, Line 44, delete "401 a" and insert -- 401a --, therefor.

In Column 3, Line 34, delete "3d" and insert -- 3D --, therefor.

In Column 4, Line 18, delete "areas." and insert -- areas). --, therefor.

In the Claims

In Column 5, Lines 12-13, in Claim 1, delete "transparent display;" and insert -- display; --, therefor.

In Column 5, Line 15, in Claim 1, delete "display." and insert -- display, --, therefor.

Signed and Sealed this
Twenty-fourth Day of September, 2019

Andrei Iancu
*Director of the United States Patent and Trademark Office*